(12) United States Patent
Suzuki et al.

(10) Patent No.: US 6,483,054 B2
(45) Date of Patent: Nov. 19, 2002

(54) PRESSURE-SENSITIVE SENSOR, CONNECTOR AND COMBINING STRUCTURE THEREOF

(75) Inventors: Yasuhiro Suzuki, Shizuoka-ken (JP); Kazuyoshi Ogasawara, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/793,910

(22) Filed: Feb. 28, 2001

(65) Prior Publication Data

US 2001/0017587 A1 Aug. 30, 2001

(30) Foreign Application Priority Data

Feb. 29, 2000 (JP) ........................................ 2000-054297
Apr. 12, 2000 (JP) ........................................ 2000-111145

(51) Int. Cl.[7] .......................... H01H 3/16; E05F 15/10; E05F 15/16
(52) U.S. Cl. ................. 200/61.44; 200/61.43; 49/28
(58) Field of Search ........................... 200/61.41–61.44, 200/61.71, 61.73, 85 R, 511; 49/26–28

(56) References Cited

U.S. PATENT DOCUMENTS 5,192,837 A * 3/1993 Chardon .................. 200/61.41
5,296,658 A * 3/1994 Kramer et al. ........... 200/61.43
5,459,962 A * 10/1995 Bonne et al. ............. 200/61.43
5,728,984 A * 3/1998 Miller ...................... 200/61.43
5,834,719 A * 11/1998 Kaji et al. ................ 200/61.43
6,107,580 A * 8/2000 Hoshikawa et al. ...... 200/61.43

FOREIGN PATENT DOCUMENTS

JP          9-180578          7/1997          .......... H01H/13/18

* cited by examiner

Primary Examiner—Michael Friedhofer
(74) Attorney, Agent, or Firm—Finnegan, Henderson, Farabow, Garrett & Dunner, L.L.P.

(57) ABSTRACT

A pressure-sensitive sensor is provided with a tube member having a hollow portion defined by an inner wall and made of flexible material, a first belt-like electrode disposed on an upper side of the tube member in the tube member and a second belt-like electrode disposed on a lower side of the hollow portion in the tube member so as to oppose the first belt-like electrode. When the pressure-sensitive sensor is pressed, the first belt-like electrode and the second belt-like electrode are capable of contacting each other so as to ensure conductivity. Further the pressure-sensitive sensor has a contact adjusting portion provided on an inner wall of the tube member and for adjusting a contact between the first belt-like electrode and the second belt-like electrode. Additionally, a connector capable of being combined with such a pressure-sensitive sensor is also disclosed.

18 Claims, 9 Drawing Sheets

PRESSURE-SENSITIVE SENSOR, CONNECTOR AND COMBINING STRUCTURE THEREOF

BACKGROUND OF THE INVENTION

The present invention relates to a pressure-sensitive sensor, a connector and a combining structure thereof and, more particularly, to a pressure-sensitive sensor for sensing whether or not a foreign matter is caught by a glass of a power window or the like of a vehicle when it is closed, a connector for connecting such a pressure-sensitive sensor to a wire so as to ensure conductivity between the two and a combining structure of the pressure-sensitive sensor and connector.

Some type of vehicle has a pressure-sensitive sensor disposed on the top of a window frame of its door for detecting whether or not this pressure-sensitive sensor is pressed by a foreign matter when its power window glass rises to be closed. When the pressure-sensitive sensor is pressed by the foreign matter, it is so constructed that the glass is stopped from rising.

FIG. 16 is a sectional view showing an outline of a pressure-sensitive cable switch disclosed in Japanese Patent Application Laid-Open Publication No. H9-180578.

In FIG. 16, a pressure-sensitive cable switch 101 comprises an oval rubber tube 102, which is formed such that an inside is hollow and installed on a upper portion of a window frame constituting a vehicle door, two metallic conductors 104, 105 composed of conductor wires disposed so as to oppose each other across a bending neutral axis 103 in the rubber tube 102, a belt-like electrode 106 composed of conductive rubber material disposed on an upper side of the rubber tube 102 with respect to the bending neutral axis 103 while part thereof is in contact with a metallic conductor 105 and a belt-like electrode 107 composed of conductive rubber material disposed on a lower side of the rubber tube 102 with respect to the bending neutral axis 103 while part thereof is in contact with a metallic conductor 105.

With such a structure, if a hand or neck of man is caught by a top portion of glass of a vehicle power window when the power window is ascending, his arm, head or shoulder comes into contact with a lower side of the rubber tube, so that the lower portion of the rubber tube 102 is pressed toward the upper side. When the rubber tube 102 becomes flat, the respective belt-like electrodes 106, 107 inside contact each other. Then, the metallic conductors 104, 105 connected to the respective belt-like electrodes 106, 107 become conductive with each other, thereby stopping an ascent of the glass.

Connection of the pressure-sensitive sensor to the wire so as to ensure conductivity is considered to be carried out by connecting an end of an electrode of the pressure-sensitive sensor to an end of the wire.

More specifically, an end in the length direction of this wire is soldered to a copper plate and the copper plate is bonded to a side face of a rubber plate. On the other side face of this rubber plate, a copper plate soldered to wire is also bonded, so that entirely, the rubber plate is sandwiched by the wires via the copper plates.

When coupling the electrodes with the wires mounted in this way, first the wires are nipped by ends of the electrodes disposed to oppose each other, so as to bring the ends of the wire and electrode into contact with each other.

After that, a worker fastens a portion where the wire contacts the electrode by winding metallic wire by hands and then, the connecting work is completed.

SUMMARY OF THE INVENTION

However, when the conventional pressure-sensitive cable switch 101 is disposed on a curved portion of a window frame portion or the like, the rubber tube 102 is bent. Consequently, differences of the inside and outside diameters occur on the upper side and lower side of the rubber tube 102, so that the rubber tube becomes flatter.

As a result, a minimum distance between the belt-like electrodes 106 and 107, particularly a distance between ends of the respective belt-like electrodes 106, 107 is reduced considerably, so that it can be considered to send out an error signal by reacting to a minute vibration sensitively.

The present invention has been achieved in views of the above described studies and therefore, an object of the present invention is to provide a pressure-sensitive sensor which can be actuated accurately if it is bent or a certain force is applied, and can be installed on an entire periphery of the window frame. Further, this pressure-sensitive sensor can be produced through a single extruding process, thereby suppressing the price of the sensor.

In case where connection of the pressure-sensitive sensor with the wire is carried out by winding a metallic wire, if the metallic wire is wound tightly, it can be considered that the wire ends and the electrodes of the sensor may be cut out from a portion on which the metallic wire is wound. If the metallic wire is wound loosely, connection of the wires with the sensor becomes insufficient so that the wire may be slipped out. Thus, connection between the sensor and the wire becomes unsecured and therefore, in order to obtain a secure conductivity, it is necessary to form a new structure.

Further, a worker has always to pay attention to tightness of metallic wire winding when connecting the conventional sensor to the wire without a connection failure and therefore, it takes time and labor to wind the metallic wire and this processing step is particularly required.

Accordingly, another object of the present invention is to provide a connector and a combining structure of a pressure-sensitive sensor and the connector, which can extinguish a connection failure in connecting the pressure-sensitive sensor with the wire, effectively so as to ensure conductivity, thereby making it possible to reduce the number of processing steps.

To achieve the above object, according to an aspect of the present invention, there is provided a pressure-sensitive sensor provided with: a tube member containing a hollow portion defined by an inner wall thereof and made of flexible material, the tube member extending in a predetermined direction; a first belt-like electrode disposed on a upper side of the hollow portion of the tube member and extending in the predetermined direction; a second belt-like electrode disposed on a lower side of the hollow portion of the tube member so as to oppose the first belt-like electrode and extending in the predetermined direction, the first belt-like electrode and the second belt-like electrode being capable of contacting each other ensuring conductivity when the pressure-sensitive sensor is pressed; and a contact adjusting portion provided on an inner wall of the tube member and for adjusting a contact between the first belt-like electrode and the second belt-like electrode.

According to another aspect of the present invention, there is provided a connector for use in a pressure-sensitive sensor for connecting a wire to the pressure-sensitive sensor so as to ensure conductivity. The pressure-sensitive sensor is provided with: a tube member containing a hollow portion defined by an inner wall thereof and made of flexible material, the tube member extending in a predetermined direction; a first belt-like electrode disposed on a upper side of the hollow portion of the tube member and extending in the predetermined direction; and a second belt-like electrode disposed on a lower side of the hollow portion of the tube member so as to oppose the first belt-like electrode and extending in the predetermined direction, the first belt-like electrode and the second belt-like electrode being capable of contacting each other when the pressure-sensitive sensor is pressed. The connector is provided with: a housing main body; an insertion link portion provided on a side of the housing main body and formed so as to be enlarged gradually from a front end thereof to a base portion thereof so that it is capable of being inserted into the hollow portion in the pressure-sensitive sensor from an end of the pressure-sensitive sensor; terminals capable of being connected to the first electrode and the second electrode so as to ensure conductivity in a condition that the insertion link portion is inserted into the hollow portion; and an engagement connecting portion provided on the other side of the housing main body and capable of being fit to a mating connector linked to a terminal of the wire so that the other end of the terminal is connected to the terminal so as to ensure conductivity.

According to still another aspect of the present invention, there is provided a combining structure of a pressure-sensitive sensor and a connector. The combining structure includes: a pressure-sensitive sensor provided with: a tube member containing a hollow portion defined by an inner wall thereof and made of flexible material, the tube member extending in a predetermined direction; a first belt-like electrode disposed on a upper side of the hollow portion of the tube member and extending in the predetermined direction; and a second belt-like electrode disposed on a lower side of the hollow portion of the tube member so as to oppose the first belt-like electrode and extending in the predetermined direction, the first belt-like electrode and the second belt-like electrode being capable of contacting each other when the pressure-sensitive sensor is pressed, and a connector provided with: a housing main body; an insertion link portion provided on a side of the housing main body and formed so as to be enlarged gradually from a front end thereof to a base portion thereof so that it is capable of being inserted into the hollow portion in the pressure-sensitive sensor from an end of the pressure-sensitive sensor; terminals having ends capable of being respectively connected to the first electrode and the second electrode so as to ensure conductivity in a condition that the insertion link portion is inserted into the hollow portion; and an engagement connecting portion provided on the other side of the housing main body and capable of being fit to a mating connector linked to a terminal of the wire so that the other end of the terminal is connected to the terminal so as to ensure conductivity.

Other and further features, advantages, and benefits of the present invention will become more apparent from the following description taken in conjunction with the following drawings.

DETAILED DESCRIPTION OF THE PREFERRED EMBODIMENTS

Hereinafter, a pressure-sensitive sensor, a connector and a combining structure thereof according to the preferred embodiments of the present invention will be described with reference to the accompanying drawings.

First, the pressure-sensitive sensor, connector and combining structure of the first embodiment of the present invention will be described with reference to FIGS. 1 to 12.

Figure 1:
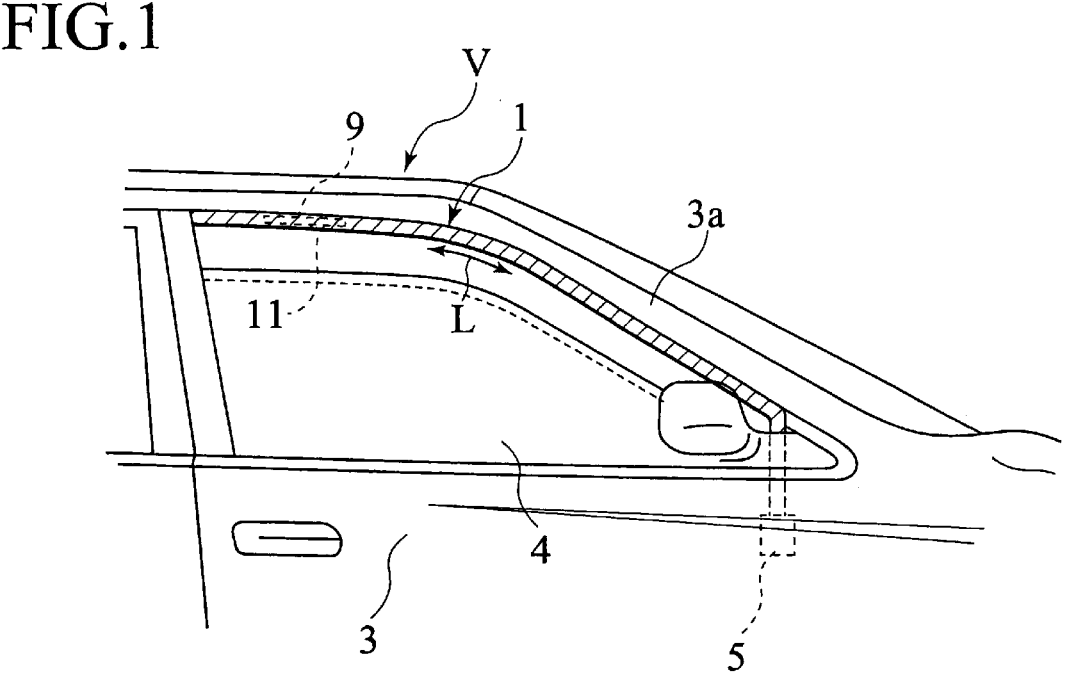
FIG. 1 is a side view of a vehicle employing a pressure-sensitive sensor having a connector according to a first embodiment of the present invention.
Figure 2:
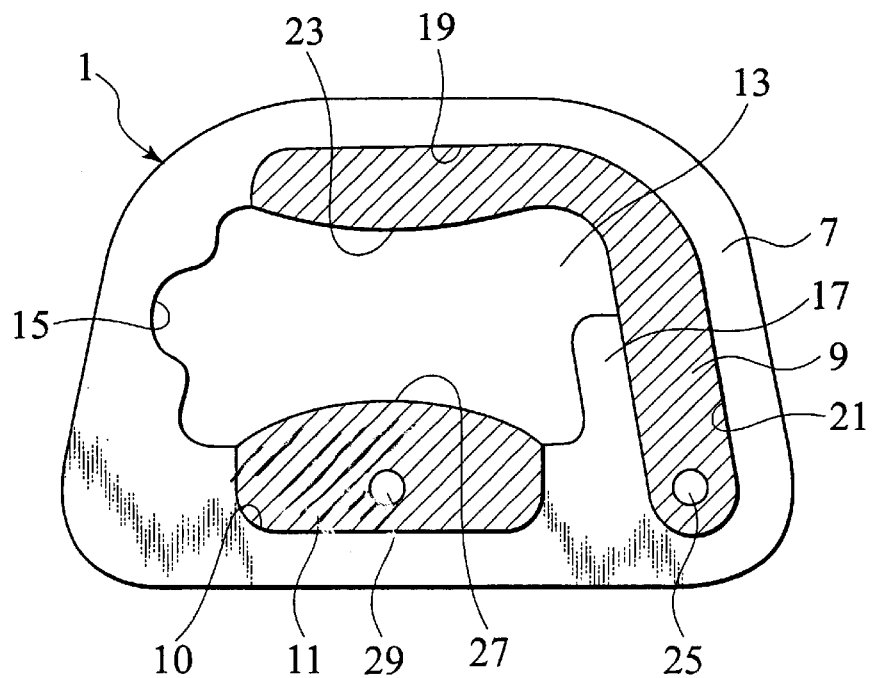
FIG. 2 is a sectional view of the pressure-sensitive sensor as shown in FIG. 1.
Figure 3:
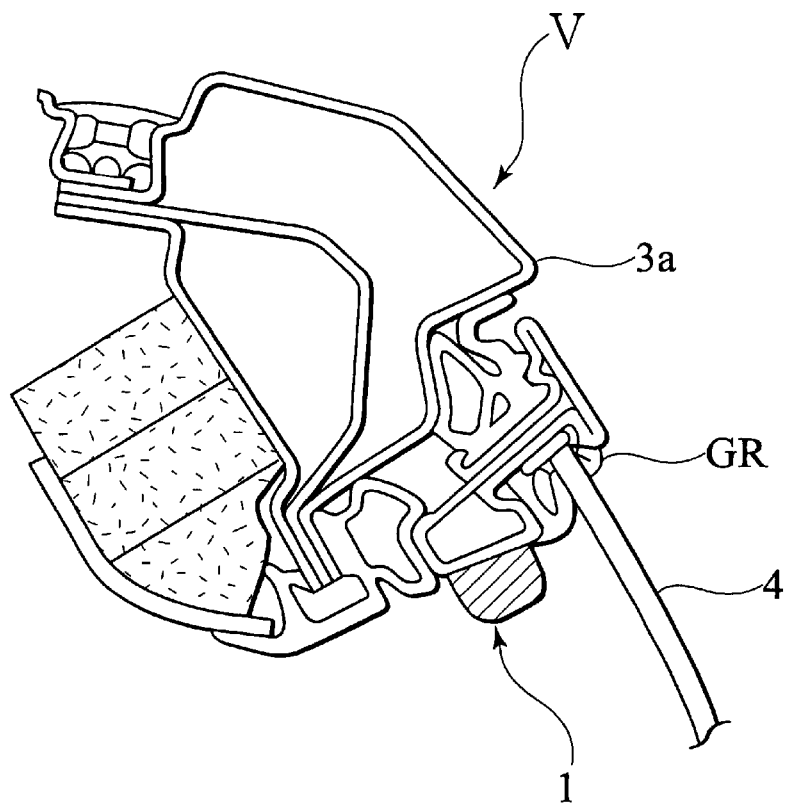
FIG. 3 is a sectional view showing a detailed structure of a window frame as shown in FIG. 1.
Figure 4:
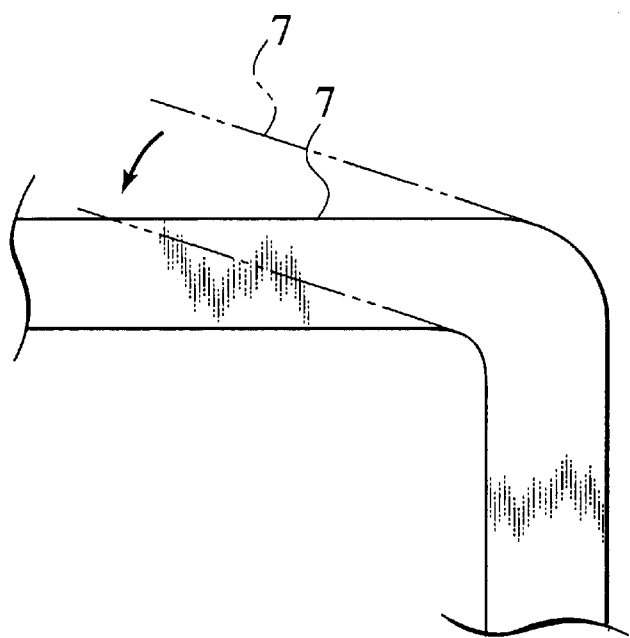
FIG. 4 is a side view showing a condition in which the pressure-sensitive sensor as shown in FIG. 1 is bent.
Figure 5:
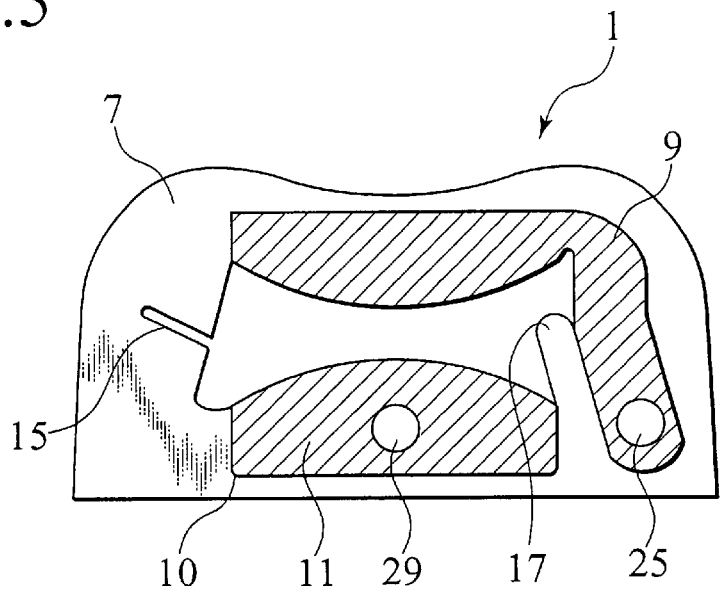
FIG. 5 is a sectional view showing a detailed configuration of a bent portion of the pressure-sensitive sensor as shown in FIG. 1.
Figure 6:
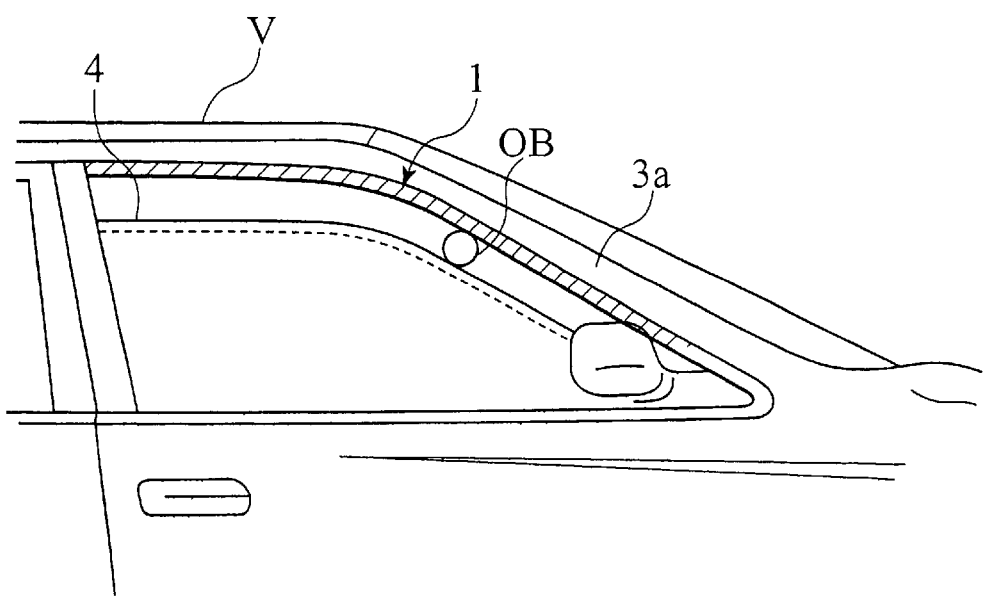
FIG. 6 is a side view showing a condition in which the pressure-sensitive sensor as shown in FIG. 1 detects a foreign matter.
Figure 7:
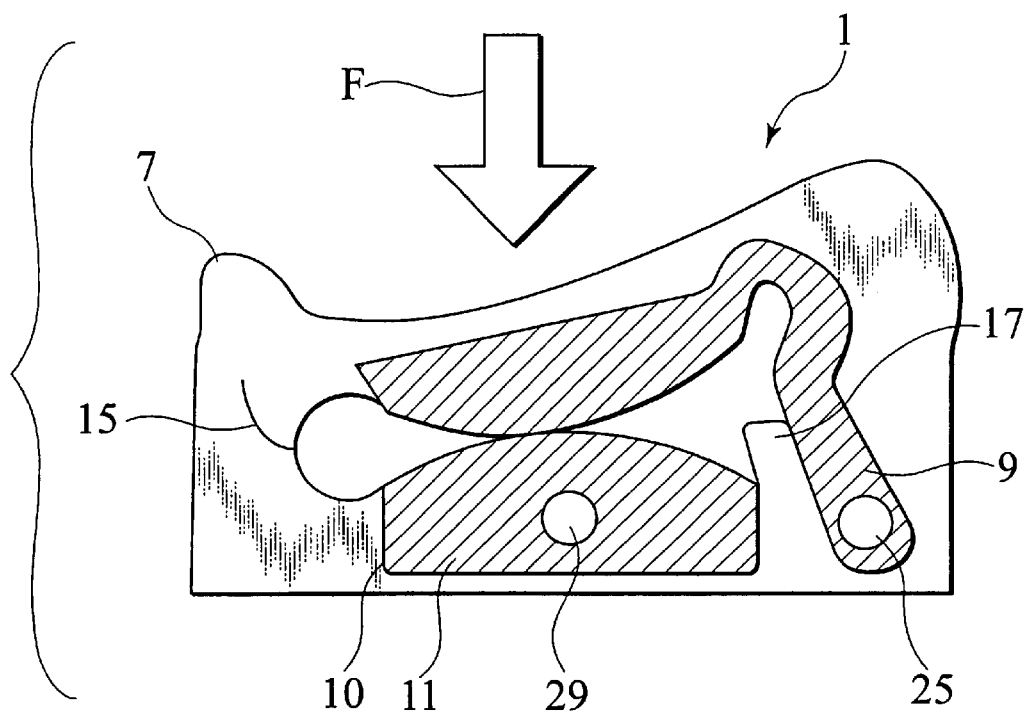
FIG. 7 is a sectional view showing a detailed configuration when the pressure-sensitive sensor as shown in FIG. 1 detects a foreign matter.

FIG. 1 is a side view of a vehicle V employing the pressure-sensitive sensor, connector and combining structure thereof according to a first embodiment of the present invention. FIG. 2 is a sectional view of the pressure-sensitive sensor shown in FIG. 1. Meantime, FIG. 2 shows it in inverted condition. FIG. 3 is a sectional view showing a detailed structure of a window frame 3a shown in FIG. 1 and FIG. 4 is a side view showing a condition in which the pressure-sensitive sensor 1 is bent. FIG. 5 is a sectional view showing a detailed configuration of a bent portion of the pressure-sensitive sensor. FIG. 6 is a side view showing a condition in which the pressure-sensitive sensor detects a foreign matter OB. FIG. 7 is a sectional view showing a detailed configuration when the pressure-sensitive sensor detects the foreign matter OB.

Figure 8:
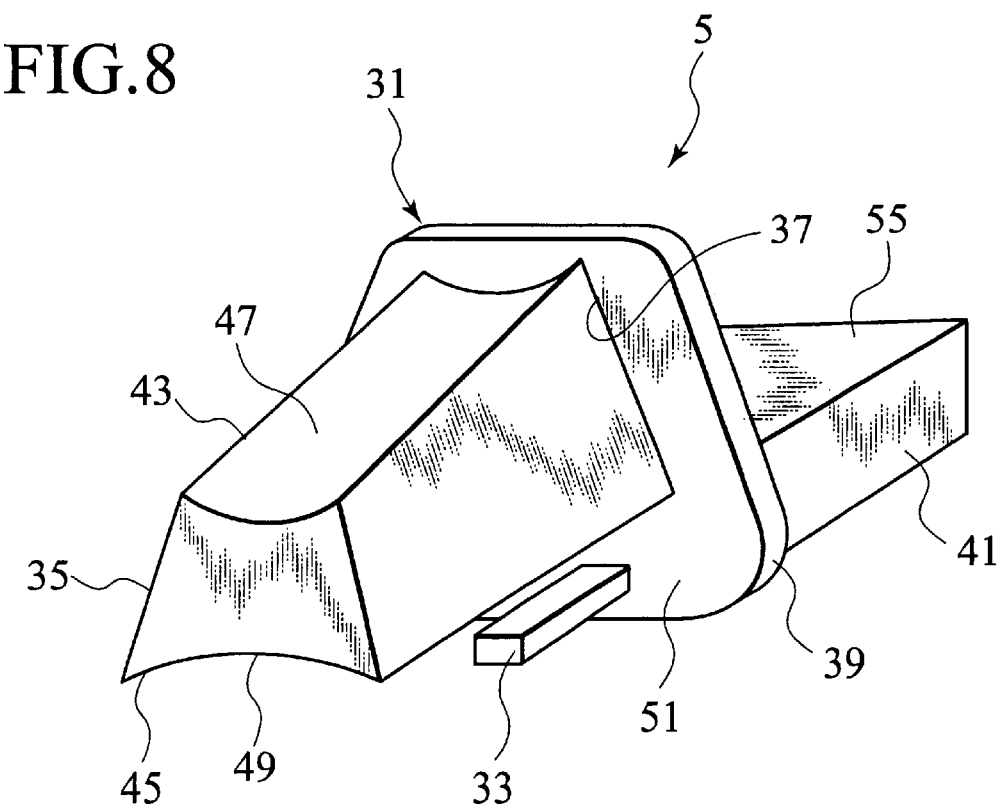
FIG. 8 is a perspective view of a connector as shown in FIG. 1.
Figure 9:
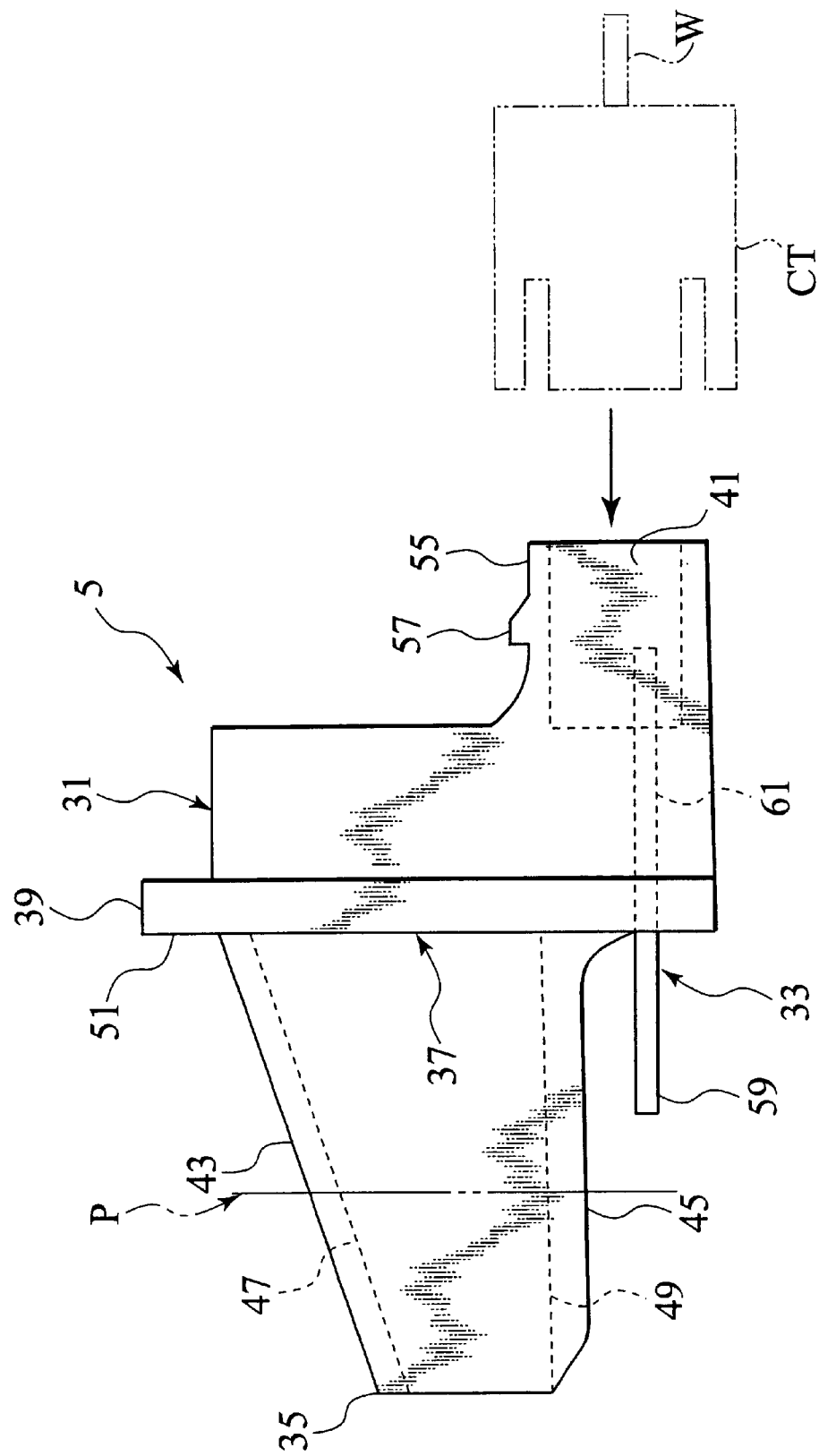
FIG. 9 is a side view of the connector as shown in FIG. 1.
Figure 10:
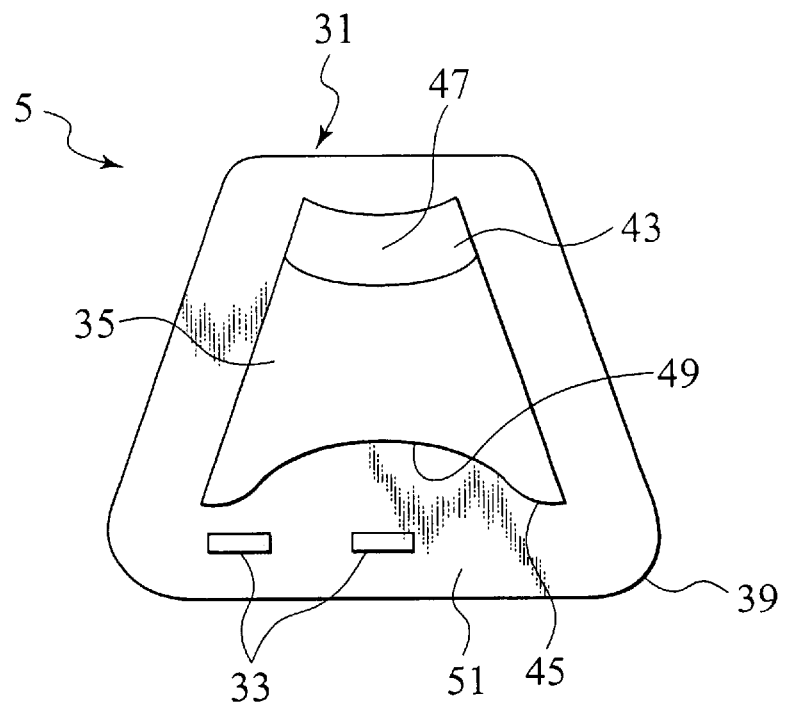
FIG. 10 is a front view of the connector as shown in FIG. 1.
Figure 11:
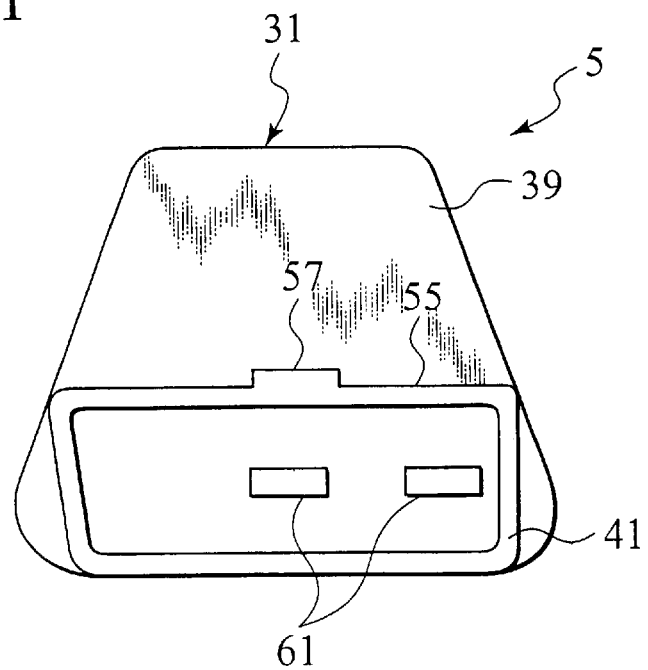
FIG. 11 is a rear view of the connector as shown in FIG. 1.
Figure 12:
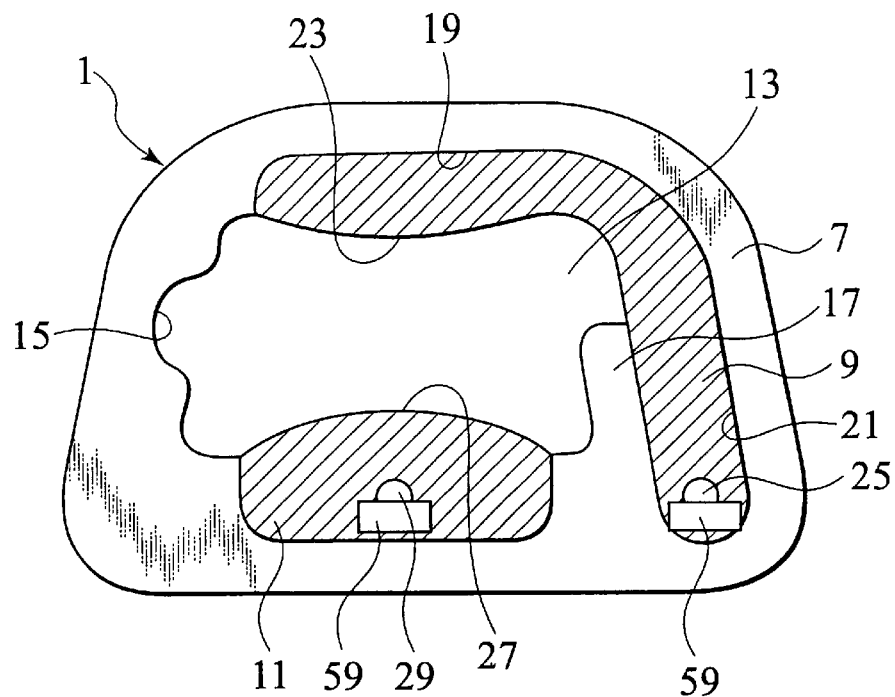
FIG. 12 is a sectional view showing a connecting condition between the pressure-sensitive sensor and the connector as shown in FIG. 1.

FIG. 8 is a perspective view of a connector 5 shown in FIG. 1. FIG. 9 is a side view of the connector 5. FIG. 10 is a front view of the connector 5. FIG. 11 is a rear view of the connector 5. FIG. 12 is a sectional view showing a connecting condition between the pressure-sensitive sensor 1 and the connector 5.

As shown in FIG. 1, the pressure-sensitive sensor 1 is a long sensor having a length L and provided along the top portion and side portion of a window frame 3a of a door 3 of vehicle V. The connector 5 is connected to an end of this pressure-sensitive sensor 1. A mating connector CT connected to an end of a wire W is connected to this connector 5 representatively as shown in FIG. 9.

As shown in FIG. 2, the pressure-sensitive sensor 1 includes a hollow tube 7 and first and second electrodes 9, 11 disposed in the tube 7.

The tube 7 is made of flexible material such as long rubber formed by extrusion and its sectional shape is a trapezoid containing the hollow portion 13. A concave portion 15 and a separating protrusion 17 are provided on an inside side face of this tube 7 to contribute to securing of an accurate operation of the pressure-sensitive sensor 1.

The first and second electrodes 9, 11 are formed of conductive rubber or conductive resin and disposed on upper and lower inside faces along the length direction L of the tube 7 such that they oppose each other.

The first electrode 9 is provided on a upper side of the tube 7 such that it is disposed along an inside upper face 19 and inside side face 21 of the tube 7 with an inverted-L shaped section. This first electrode 9 has a convex portion 23 such that a bottom face near the center of a top face 19 of the tube 7 is protruded downward, the convex portion being extended along the length direction L. A metallic electrode 25 formed of conductive wire is provided in a bottom end portion of the first electrode 9 such that it runs therein along the length direction L.

The second electrode 11 is provided in the concave portion 10 in an inside bottom face of the tube 7 along the length direction L and has a convex portion 27 such that a top face near the center thereof is protruded upward, along the length direction L. A metallic electrode 29 formed of conductive wire is provided in this second electrode 11 along the length direction L like the first electrode 9.

The metallic electrodes 25, 29 are structural members of the pressure-sensitive sensor 1, providing with the entire pressure-sensitive sensor with a strength in the length direction L.

As shown in FIG. 1, the pressure-sensitive sensor 1 is mounted to the window frame 3a of vehicle V, for example, near glass run GR of the window frame 3a, with a bottom side of the pressure-sensitive sensor 1 facing upward. Even if the tube 7 of the pressure-sensitive sensor 1 is bent at the bent portion of the window frame 3a as shown in FIG. 4 by changing a phantom line to a solid line, the concave portion 15 of the rubber tube shown in FIG. 5 is contracted, so that a sectional shape of the entire tube 7 is changed just from trapezoid to square and the separating protrusion 17 prevents the belt-like electrodes 9, 11 from contacting each other. Even if a minute vibration is applied, these belt-like electrodes 9, 11 never contact each other. That is, in such a case, the concave portion 15 and the separating protrusion 17 function as a contact adjusting portion for the belt-like electrodes 9, 11.

If the hand or neck of a man is pinched by a top portion of the glass 4 when the glass 4 of the power window is lifted up as shown in FIG. 6 so that his arm, head or shoulder makes contact with the lower side of the tube 7 (upper side of the tube 7 in correspondence with in FIG. 1) and the lower side (upper side of the tube 7 in correspondence with FIG. 1) of the tube 7 is pressed to the upper side (lower side of the tube 7 in correspondence with FIG. 1), the upper side of the pressure-sensitive sensor 1 is pressed downward by a force F, so that the concave portion 15 is crushed completely, thereby making the central portions (protrusions 23, 27) of the respective electrodes 9, 11 inside contact each other.

Consequently, the metallic electrodes 25, 29 connected to the respective belt-like electrodes 9, 11 become conductive so as to notify the power window mechanism that the foreign matter OB is pinched, thereby stopping the rise of the glass 4.

As shown in FIG. 8, the connector 5 comprises a housing main body 31 and a terminal 33 provided on this housing main body 31.

The housing main body 31 comprises an insertion link portion 35 made of synthetic resin or the like and provided on a side thereof, a stopper portion 39 provided on an end on the side of a base portion 37 of the insertion link portion 35 and an engagement connecting portion 41 provided on the other side of the housing main body 31.

As shown in FIGS. 9, 10, the insertion link portion 35 is made of a column having a trapezoidal section, protruded from the base portion 37 of the housing main body 31 and has concave portions 47, 49 extending vertically relative to a section thereof, namely, in the length direction of the connector 5, in both an upper face 43 and a lower face 45. The upper face 43 is a tapered face inclined upward toward the base portion 37 from a front end of the face.

The insertion link portion 35 has a section smaller than a section of the hollow portion 13 of the pressure-sensitive sensor 1 from the front end thereof up to a predetermined position P in the length direction of the connector 5 and a section larger than the section of the hollow portion 13 is provided from the predetermined position P in the length direction up to the base portion 37.

The stopper portion 39 is provided along the end on the side of the base portion 37 of the insertion link portion 35 as shown in FIG. 8. The stopper portion 39 is made of a sheet-like body provided in the form of a flange. When the insertion link portion 35 is inserted into the hollow portion 13 of the pressure-sensitive sensor 1, an end face of the pressure-sensitive sensor 1 comes into contact with a side face 51 so as to position the pressure-sensitive sensor 1 thereby preventing the connector 5 from being inserted excessively into the pressure-sensitive sensor 1.

As shown in FIGS. 9, 11, the engagement connecting portion 41 is a rectangular solid protruded to an opposite side to the insertion link portion 35 from the base portion 37 of the housing main body 31 in the length direction of the connector 5, the rectangular solid having a section long in the width direction. This engagement connecting portion 41 has a protrusion 57 provided on a top face 55 of its outside faces, and when the mating connector connected to the wire is fit to this connector, the protrusion 57 engages with the mating connector.

As the terminals 33, as shown in FIGS. 8 to 11, two rectangular sheet-like bodies are made of conductive metal like copper and disposed in parallel in the width direction of the connector 5. As shown in FIGS. 10, 11, these terminals 33 are so constructed that an end 59 of each thereof in the length direction of the connector 5 is protruded from the base portion 37 of the housing main body 31 while the other end 61 thereof is protruded into the engagement connecting portion 41.

When the connector 5 is connected to the pressure-sensitive sensor 1, as shown in FIG. 12, the end 59 of the terminal 33 is connected to a metallic electrode such that mainly a top face of the terminal 33 contacts mainly a lower edge of the metallic electrode. When a mating connector is fit to the engagement connecting portion 41, the other end 61 of each of the terminal 33 is connected to the terminal of the mating connector.

As described above, the pressure-sensitive sensor 1 and the connector 5 are connected to each other so as to ensure conductivity. A procedure therefor will be described below.

When connecting the pressure-sensitive sensor 1 to the connector 5, first, the insertion link portion 35 and the hollow portion 13 are kept opposing each other so that sectional shapes of them match each other.

Next, the insertion link portion 35 is inserted from an end of the pressure-sensitive sensor 1 into the hollow portion 13 in the length direction thereof up to the position P in which a sectional shape of the pressure-sensitive sensor 1 is smaller than the sectional shape of the hollow portion 13. At this time, the upper/lower concave portions 47, 49 in the insertion link portion 35 are fit to the convex portions 23, 27 of the first and second electrodes 9, 11 of the pressure-sensitive sensor 1. Therefore, the metallic electrodes 25, 29 of the pressure-sensitive sensor 1 are positioned relative to the terminals 33 of the connector 5.

Next, with this positioning condition, the insertion link portion 35 is inserted further into the hollow portion 13 so that an end face of the pressure-sensitive sensor 1 comes into contact with the side face 51 of the stopper portion 39. Consequently, the pressure-sensitive sensor 1 is finally positioned so as to connect the pressure-sensitive sensor 1 to the connector 5.

Because a portion having a larger section than that of the hollow portion 13 of the insertion link portion 35 of the connector 5 is inserted into the hollow portion 13 of the pressure-sensitive sensor 1 at this time, the pressure-sensitive sensor 1 is stretched upward relative to the insertion link portion 35 along the tapered upper face 43. Thus, the connector 5 is supported securely by the pressure-sensitive sensor 1 through an urging force of the tube 7.

As shown in FIG. 11, the lower edges of the metallic electrodes 25, 29 of the pressure-sensitive sensor 1 contact the top faces of the terminals 33 of the connector 5, so that the connector 5 is conductive with the pressure-sensitive sensor 1.

By connecting the mating connector on the side of the wire to the engagement connecting portion 41 of the connector 5 connected to the pressure-sensitive sensor 1, the pressure-sensitive sensor 1 can be connected to the wire end portion with the mating connector easily and securely, so as to ensure conductivity.

According to this embodiment, as described above, the internally-hollow trapezoidal tube 7 is used and one belt-like electrode 9 is disposed in the upper portion of the tube 7 while the other belt-like electrode 11 is disposed in the lower portion of the tube 7, so that there is a distance between end portions of the respective belt-like electrodes 9 and 11. Thus, even if the tube 7 is bent at the bent portion of the window frame 3a when mounting the pressure-sensitive sensor 1 near the glass run GR of the window frame 3a, the sectional shape of the tube 7 is only changed from trapezoid to square so that the respective belt-like electrodes 9, 11 disposed in the tube 7 never contact each other unexpectedly. Therefore, a malfunction due to a slight vibration can be prevented so as to achieve an accurate operation.

Further, because according to this embodiment, the tube 7 employs a shape which can be produced by a single extrusion, the price of the entire pressure-sensitive sensor 1 can be suppressed. Thus, production cost can be reduced and therefore, cost competitiveness of the product can be increased.

Further, according to this embodiment, the belt-like electrode 9 disposed in the upper portion of the tube 7 is constructed in the shape of an inverted-L letter and then, by using stiffness possessed by this belt-like electrode 9 (at least stiffness higher than the stiffness of the tube 7), the belt-like electrode 9 is provided with a function acting as a bone when the tube 7 is deformed. Thus, even if the pressure-sensitive sensor 1 is mounted near the glass run GR of the window frame 3a so that the tube 7 is bent at the bent portion of the window frame 3a, the amount of deformation of the tube 7 can be decreased.

Further, according to this embodiment, the separating protrusion 17 is formed on the bottom in the tube 7. As a result, if the tube 7 is bent so that its sectional shape is changed from trapezoid to square and a distance between the lower portion of the belt-like electrode 9 and the end portion of the belt-like electrode 11 is decreased, the separating protrusion 17 prevents the lower portion of the belt-like electrode 9 from contacting the end portion of the belt-like electrode 11. Consequently, even when the tube is bent or a reasonable force is applied thereto, no malfunction occurs.

Further, according to this embodiment, the concave portion 15 is formed in the tube 7, so that when the top portion of the tube 7 is pressed downward, this concave portion 15 is contracted so as to shrink the tube 7 in the urging direction. Therefore, when the top portion of the tube 7 is pressed downward, the top portion of the tube 7 is prevented from being fallen laterally thereby preventing a malfunction.

Further, according to this embodiment, the belt-like electrode 11 harder than the tube 7 is disposed in the concave portion 4 formed in the bottom portion of the tube 7 and the metallic electrode 29 made of conductive wire is buried in this belt-like electrode 11. Then, the metallic electrode 25 made of conductive wire is buried in the lower end portion of the belt-like electrode 9 formed in the shape of an inverted L letter. As a result, when the pressure-sensitive sensor 1 is mounted near the glass run GR of the window frame 3a, this pressure-sensitive sensor 1 is hard to twist, thereby facilitating this mounting work.

Further, according to this embodiment, only if the insertion link portion 35 of the connector 5 is inserted into the hollow portion 13 in the pressure-sensitive sensor 1, the pressure-sensitive sensor 1 and the connector 5 can be connected to each other. Further, by connecting a mating connector to the engagement connecting portion 41 of the connector 5, the wire end portion and the connector 5 can be connected to each other so as to ensure conductivity. Therefore, it is possible to connect the wire end portion with the pressure-sensitive sensor 1 easily and securely. Because by fitting the connector 5 to the mating connector, the pressure-sensitive sensor 1 and the wire end portion can be connected to each other, not only the quantity of processing steps can be reduced but also the mounting work can be facilitated because no special attention has to be paid to this connection to ensure conductivity.

Further, according to this embodiment, when connecting the connector 5 to the pressure-sensitive sensor 1, the insertion link portion 35 having a trapezoidal section and the hollow portion 13 are kept opposing each other with their sectional shapes matching with each other. Thus, it is possible to prevent these components from being assembled in inverse direction. Further, because the top face 43 of the insertion link portion 35 is a tapered face, the insertion link portion 35 can be inserted into the hollow portion 13 easily.

Further, according to this embodiment, the pressure-sensitive sensor 1 and the connector 5 can be formed by integral molding thereby making it possible to reduce production cost.

Further, according to this embodiment, the configuration of the terminal 33 of the connector 5 can be generalized, so that it can correspond to diversified types of the mating connectors. Further, because the wire end portion is not connected to the electrode of the connector directly, a process for peeling the covering on the wire end portion can be omitted.

Although according to this embodiment, the terminal 33 of the connector 5 is formed in the form of a rectangular plate, the terminal 33 of the connector 5 may be formed in the form of a leaf spring.

Next, a pressure-sensitive sensor, a connector and a combining structure according to a second embodiment of the present invention will be described with reference to FIGS. 13 to 15. Meanwhile, this embodiment is similar to the first embodiment except that mainly the structure of the connector 63 is different. Like reference numerals are attached to like components and a description thereof is simplified or omitted.

Figure 13:
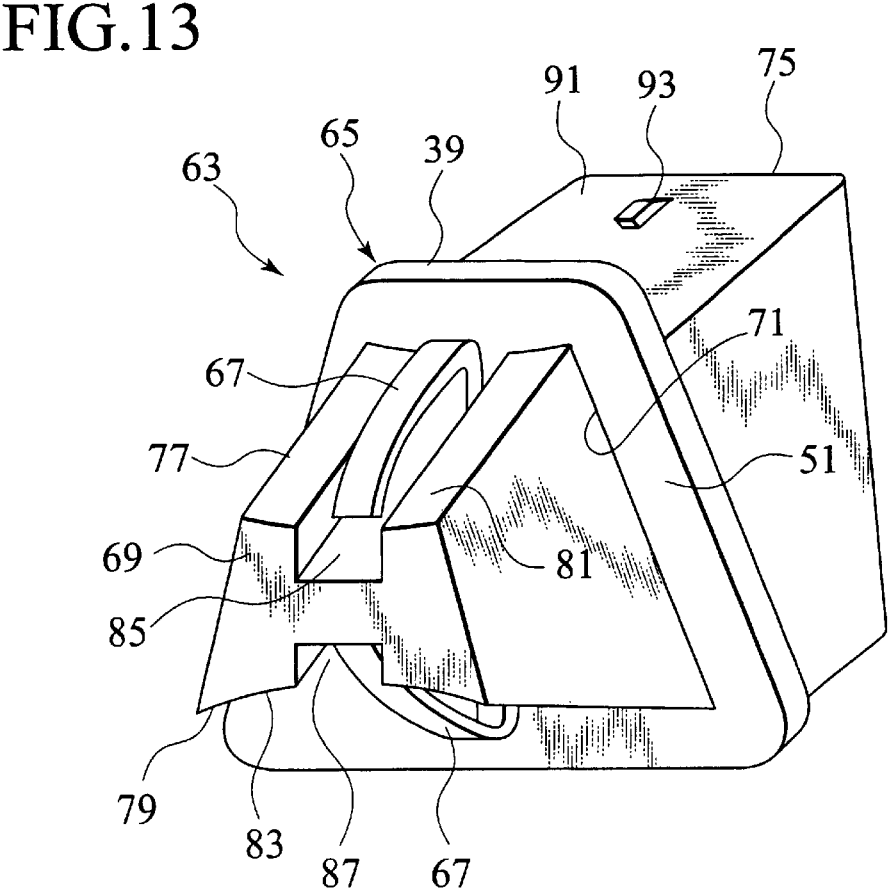
FIG. 13 is a perspective view showing a connector according to a second embodiment of the present invention.
Figure 14:
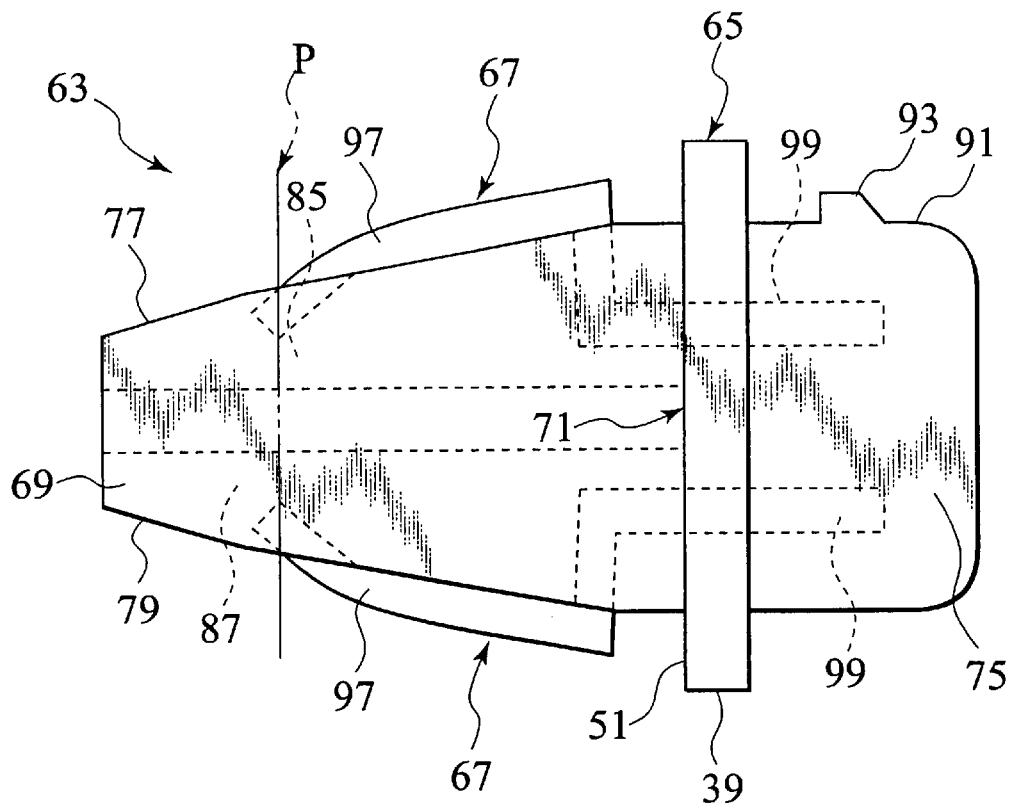
FIG. 14 is a side view of the connector as shown in FIG. 13.
Figure 15:
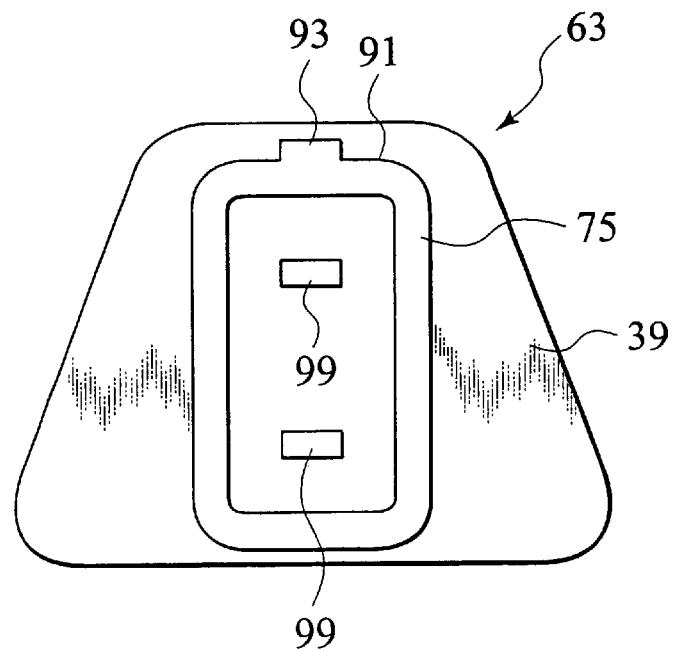
FIG. 15 is a rear view of the connector as shown in FIG. 13.
Figure 16:
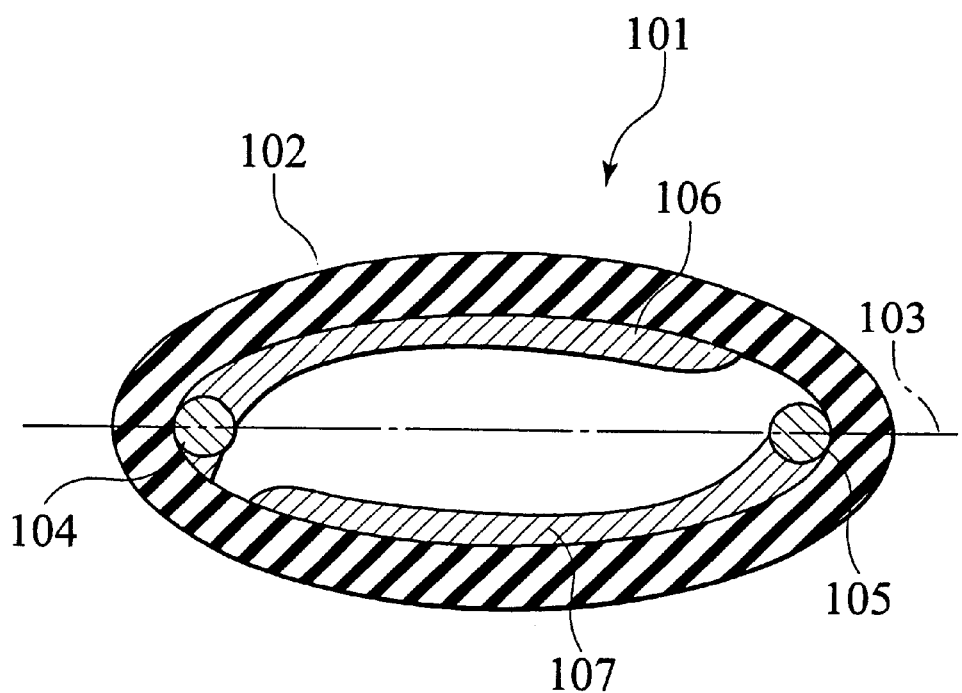
FIG. 16 is a sectional view showing an outline of a conventional pressure-sensitive cable switch.

FIG. 13 is a perspective view showing a connector 63 of this embodiment, FIG. 14 is a side view of the connector 63 and FIG. 15 is a rear view of the connector 63.

As shown in FIG. 13, the connector 63 comprises a housing main body 65 and terminals 67 provided on this housing main body 65.

The housing main body 65 is composed of synthetic resin or the like and like the first embodiment, comprises an insertion link portion 69 provided on an end thereof, a stopper portion 39 provided on an edge portion on the side of a base portion 71 of the insertion link portion 69 and an engagement connecting portion 75 provided on the other side of the housing main body 65.

As shown in FIGS. 13, 14, the insertion link portion 69 is made of a column having a trapezoidal section, protruded from the base portion 71 of the housing main body 65 and has concave portions 81, 83 extending in the length direction of the connector 63, in both an upper face 77 and a lower face 79.

Groove portions 85, 87 are provided in the concave portions 81, 83 in the length direction of the connector 63.

Both the upper face 77 and the lower face 79 are tapered faces inclined upward and downward respectively from each front end to the base portion 71.

Like the first embodiment, the insertion link portion 69 has a section smaller than a section of the hollow portion 13 of the pressure-sensitive sensor 1 from the front end thereof up to a predetermined position P in the length direction of the connector 63 and a section larger than the section of the hollow portion 13 is provided from the predetermined position P in the length direction up to the base portion 71.

More specifically, the section of the insertion link portion 69 extending from a portion in each of the groove portions 85, 87 where the terminal 67 is protruded to the base portion 71 is larger than the section of the hollow portion 13 of the pressure-sensitive sensor 1.

As shown in FIGS. 13, 15, the engagement connecting portion 75 is protruded in the length direction of the connector 63 from the base portion 71 of the housing main body 65 toward the insertion link portion 69, so that a column having a rectangular section longer in the height direction is provided. This engagement connecting portion 75 has a protrusion 93 on a top face of an outer periphery 91, which the mating connector connected to the wire end portion is fit to, so that the protrusion 93 engages with the mating connector.

The terminals 67 are a pair of sheet-like bodies made of conductive metal such as copper opposing each other as shown in FIGS. 13 to 15. As shown in FIGS. 14, 15, an end portion 97 in the length direction of the connector 63 is protruded from the base portion 71 of the housing main body 65 and shaped along an outside shape of the insertion link portion 69. The other end portion 99 is protruded into the engagement connecting portion 75 in parallel in the height direction.

More specifically, the terminals 67 are formed in the form of a leaf spring, disposed along the groove portions 85, 87 such that the end portions 97 are protruded upward and downward from the groove portions 85, 87 and curved so as to oppose each other at a predetermined interval.

When the connector 63 is connected to the pressure-sensitive sensor 1, the terminals 67 are pressed by the pressure-sensitive sensor 1 so that a distance between the end portion 97 and the other end portion 99 is shrunk and then the end portions 97 enter the groove portions 85, 87. Here, when the connector 63 is connected to the pressure-sensitive sensor 1, the terminals 67 press the first and second electrodes 9, 11 by its own elastic force. When the engagement connecting portion 75 is fit to the mating connector, the other end portions 99 in the length direction of the terminal 67 are connected to the mating connector so as to ensure conductivity.

When the connector 63 of this embodiment having the above described structure is coupled with the pressure-sensitive sensor 1, first the sectional shape of the insertion link portion is matched with the sectional shape of the hollow portion 13 such that they oppose each other.

Next, the insertion link portion 69 is inserted into the hollow portion 13 in the length direction up to a portion having a smaller section than the section of the hollow portion 13 in the pressure-sensitive sensor 1. At this time, the convex portions 23, 27 of the first and second electrodes 9, 11 of the pressure-sensitive sensor 1 engage with the upper and lower concave portions 81, 83 in the insertion link portion 69. Thus, the metallic electrodes 25, 27 of the pressure-sensitive sensor 1 are positioned relative to the terminal 67 of the connector 63.

Next, if the insertion link portion 69 is inserted into the hollow portion 13 of the pressure-sensitive sensor 1 with this positioning condition, it is pressed by the pressure-sensitive sensor 1 so that the terminals 67 enter the groove portions 85, 87 by their elastic force.

If the insertion link portion 69 is inserted into the pressure-sensitive sensor 1 with this condition, an end face of the pressure-sensitive sensor 1 comes into contact with the stopper portion 39 so that the pressure-sensitive sensor 1 is positioned. At this time, the terminals 67 press the first and second electrodes 9, 11 of the pressure-sensitive sensor 1 by their elastic force, so that the terminals 67 are connected to the first and second electrodes 9, 11 and then, the connector 63 is fixed to the pressure-sensitive sensor 1.

In the pressure-sensitive sensor 1, which is connected to the connector 63, the mating connector connected to the wire end portion is connected to the engagement connecting portion 75 of the connector 63, so that the pressure-sensitive sensor 1 is connected to the wire easily and securely.

According to this embodiment also, only by inserting the insertion link portion 69 of the connector 63 into the hollow portion 13 of the pressure-sensitive sensor 1, the pressure-sensitive sensor 1 and the connector 63 can be connected to each other and further, by connecting the mating connector to the engagement connecting portion 75 of the connector 63, the wire can be connected to the connector 63. Thus, the wire and the pressure-sensitive sensor 1 can be connected to each other easily and securely by fitting the connector 63 to the mating connector.

Further, according to this embodiment also, the pressure-sensitive sensor 1 and the wire can be connected to each other only by fitting the connector 63 to the mating connector. Thus, no special attention does not have to be paid at the time of connection, so that processing steps can be reduced thereby facilitating assembly work.

Because, according to this embodiment also, the terminals 67 press the first and second electrodes 9, 11 by their elastic force so as to be connected to the first and second electrodes. Contact pressure is increased so that a secure conductivity can be obtained. Because the terminals 67 press the electrodes 9, 11 by their elastic force, contact area is decreased, thereby reducing contact resistance.

Because, according to this embodiment also, the trapezoidal section of the insertion link portion 69 is matched with that of the hollow portion 13 when connecting the connector 63 to the pressure-sensitive sensor 1, erroneous assembly can be prevented. Further, because the upper face 77 and the lower face 79 of the insertion link portion 69 are tapered faces, the insertion link portion 69 can be inserted into the hollow portion 13 easily.

According to this embodiment also, the pressure-sensitive sensor 1 and the connector 63 can be formed by integral molding thereby making it possible to reduce production cost. Further, the configuration of the terminal 67 of the connector 63 can be generalized, thereby making it possible to meet diversified kinds of the mating connectors. Further, because the wire end portion and the electrode of the connector are not connected directly to each other unlike conventionally, a processing step for peeling the covering of the wire end portion can be eliminated.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A pressure-sensitive sensor comprising:
    a tube member having a hollow portion defined by an inner wall thereof and comprising a flexible material, the tube member extending in a predetermined direction;
    a first belt-like electrode disposed on an upper side of the hollow portion of the tube member and extending in the predetermined direction;
    a second belt-like electrode disposed on a lower side of the hollow portion of the tube member so as to oppose the first belt-like electrode and so as to extend in the predetermined direction, the first belt-like electrode and the second belt-like electrode being configured to contact each other, thereby ensuring conductivity when the pressure-sensitive sensor is pressed; and
    a contact adjusting portion provided on the inner wall of the tube member for adjusting contact between the first belt-like electrode and the second belt-like electrode, the contact adjusting portion comprising a concave portion provided in a side face of the inner wall of the tube member between the first belt-like electrode and the second belt-like electrode.

2. The pressure-sensitive sensor of claim 1, wherein the tube member has a section formed in a trapezoidal shape.

3. The pressure-sensitive sensor of claim 1, wherein the first belt-like electrode has an inverted L-shape such that the first belt-like electrode is stretched on a top face and a side face of the inner wall of the tube member.

4. The pressure-sensitive sensor of claim 1, wherein the contact adjusting portion further comprises a separating protrusion extending from a lower face toward an upper face of the inner wall of the tube member thereby separating the first belt-like electrode and the second belt-like electrode between the lower face and a side face of the inner wall of the tube member.

5. The pressure-sensitive sensor of claim 1, wherein the concave portion is allowed to be contracted between the first belt-like electrode and the second belt-like electrode, thereby adjusting a contact between the first belt-like electrode and the second belt-like electrode.

6. The pressure-sensitive sensor of claim 1, wherein the first belt-like electrode comprises a first metallic conductor buried therein, and the second belt-like electrode comprises a second metallic conductor buried therein.

7. The pressure-sensitive sensor of claim 1, wherein the first belt-like electrode and the second belt-like electrode are formed from one of conductive rubber and conductive resin.

8. A connector for use with a pressure-sensitive sensor for connecting a wire to the pressure-sensitive sensor so as to ensure conductivity, the pressure-sensitive sensor comprising a tube member having a hollow portion defined by an inner wall thereof and comprising a flexible material, the tube member extending in a predetermined direction, a first belt-like electrode disposed on an upper side of the hollow portion of the tube member and extending in the predetermined direction, and a second belt-like electrode disposed on a lower side of the hollow portion of the tube member so as to oppose the first belt-like electrode and so as to extend in the predetermined direction, the first belt-like electrode and the second belt-like electrode being configured to contact each other when the pressure-sensitive sensor is pressed, the connector comprising:
    a housing main body;
    an insertion link portion provided on a side of the housing main body and formed so as to gradually enlarge from a front end to a base portion thereof so that the insertion link portion is configured to be inserted into the hollow portion in the pressure-sensitive sensor;
    terminal ends configured to be respectively connected to the first belt-like electrode and the second belt-like electrode so as to ensure conductivity when the insertion link portion is inserted into the hollow portion; and
    an engagement connecting portion provided on an opposite side of the housing main body, the engagement connecting portion being configured to fit to a mating connector linked to a terminal of the wire.

9. The connector of claim 8, wherein the insertion link portion of the connector has a sectional shape configured to correspond to a sectional shape of the hollow portion of the pressure-sensitive sensor.

10. The connector of claim 9, wherein the sectional shape of the insertion link portion of the connector is formed in a trapezoidal shape.

11. The connector of claim 9, wherein the sectional shape of the insertion link portion of the connector tapers such that the sectional shape of the insertion link portion at the front end is configured to be smaller than the sectional shape of the hollow portion in the pressure-sensitive sensor while the sectional shape of the insertion link portion at the base portion is configured to be larger than the sectional shape of the hollow portion in the pressure-sensitive sensor.

12. The connector of claim 8, further comprising a stopper portion being configured to contact with an end face of the tube member of the pressure-sensitive sensor when the insertion link portion of the connector is fully inserted into the hollow portion of the pressure-sensitive sensor.

13. The connector of claim 8, wherein the terminal ends are formed corresponding to an external shape of the insertion link portion of the connector.

14. The connector of claim 13, wherein the terminal ends have elasticity.

15. The connector of claim 14, wherein the terminal ends are deformed when the insertion link portion of the connector is inserted into the hollow portion in the pressure-sensitive sensor.

16. The connector of claim 8, wherein the pressure-sensitive sensor further comprises a contact adjusting portion provided on an inner wall of the tube member for adjusting contact between the first belt-like electrode and the second belt-like electrode.

17. A combination of a pressure-sensitive sensor and a connector, comprising:

a pressure-sensitive sensor comprising:

a tube member having a hollow portion defined by an inner wall thereof and comprising a flexible material, the tube member extending in a predetermined direction;

a first belt-like electrode disposed on an upper side of the hollow portion of the tube member and extending in the predetermined direction; and a second belt-like electrode disposed on a lower side of the hollow portion of the tube member so as to oppose the first belt-like electrode and so as to extend in the predetermined direction, the first belt-like electrode and the second belt-like electrode being configured to contact each other when the pressure-sensitive sensor is pressed; and a connector comprising:

a housing main body;

an insertion link portion provided on a side of the housing main body and formed so as to gradually enlarge from a front end to a base portion thereof so that the sectional shape is configured to be inserted into the hollow portion in the pressure-sensitive sensor;

terminal ends configured to be respectively connected to the first belt-like electrode and the second belt-like electrode so as to ensure conductivity when the insertion link portion is inserted into the hollow portion; and an engagement connecting portion provided on an opposite side of the housing main body, the engagement connecting portion being configured to fit to a mating connector linked to a terminal of the wire.

18. The combination of claim 17, wherein the pressure-sensitive sensor further comprises a contact adjusting portion provided on an inner wall of the tube member for adjusting contact between the first belt-like electrode and the second belt-like electrode.

\* \* \* \* \*